United States Patent [19]

Kosho et al.

[11] Patent Number: 4,821,402
[45] Date of Patent: Apr. 18, 1989

[54] NC LATHE WITH ROBOT FOR AUTOMATICALLY EXCHANGING WORK AND CHUCK CLAW

[75] Inventors: Akira Kosho; Hideaki Matsuki; Hidefumi Shiratori; Shosaku Sawada; Yoshitaka Kondo, all of Abiko, Japan

[73] Assignee: Hitachi Seiki Co., Ltd., Tokyo, Japan

[21] Appl. No.: 715,947

[22] Filed: Mar. 25, 1985

[30] Foreign Application Priority Data

Mar. 24, 1984 [JP] Japan .................. 59-056689

[51] Int. Cl.$^4$ ............................. B23Q 3/00
[52] U.S. Cl. ...................... 29/568; 82/125; 364/474.1
[58] Field of Search ............ 29/568; 82/2.5, 2.7; 364/474

[56] References Cited

U.S. PATENT DOCUMENTS

| | | | |
|---|---|---|---|
| 3,744,125 | 7/1973 | Schalles | 29/568 |
| 4,359,815 | 11/1982 | Toyoda | 29/568 |
| 4,370,705 | 1/1983 | Imazeki et al. | 364/474 |
| 4,396,974 | 8/1983 | Imazeki et al. | 364/474 |
| 4,430,717 | 2/1984 | Senda et al. | 29/568 |
| 4,460,966 | 7/1984 | Chynoweth et al. | 29/568 |
| 4,532,692 | 8/1985 | Miyachi | 29/568 |
| 4,581,810 | 4/1986 | Kawakami et al. | 29/568 |

FOREIGN PATENT DOCUMENTS

| | | | |
|---|---|---|---|
| 2159552 | 6/1973 | Fed. Rep. of Germany | 29/568 |
| 2624775 | 12/1977 | Fed. Rep. of Germany | 29/568 |
| 109255 | 6/1983 | Japan | 82/2.7 |
| 115106 | 7/1984 | Japan | 29/568 |

Primary Examiner—Gil Weidenfeld
Assistant Examiner—Daniel W. Howell
Attorney, Agent, or Firm—Cushman, Darby & Cushman

[57] ABSTRACT

An NC lathe with a robot for automatically exchanging works and chuck claws comprising a numerically controlled lathe having a rotatable chuck, a robot disposed in the vicinity of the numerically controlled lathe, and a feeder disposed in the vicinity of the robot. Groups of works and magazines containing chuck claws are placed on the pallets carried on the feeder, forming respective sets. The robot executes the exchanging operation of the works and the chuck claws between the feeder and the chuck.

7 Claims, 8 Drawing Sheets

વ4,821,402

NC LATHE WITH ROBOT FOR AUTOMATICALLY EXCHANGING WORK AND CHUCK CLAW

BACKGROUND OF THE INVENTION

This invention relates to an NC lathe with a robot for automatically exchanging works and chuck claws and which is capable of continuous operation by using the robot for exchanging the works and the chuck claws.

In a NC lathe, generally, when the machining of a work A is finished, and is exchanged for a subsequent work B, the chuck claws on the main spindle must be exchanged for those appropriate for the work B. This exchange of the chuck claws in the conventional NC lathe is manually conducted by the operator, which takes a long time. In other words, the time for the arrangement step is long, which inconveniently leads to reduction in the operating efficiency of the NC lathe and poor productivity.

Generally, as compared with the machining time of a machining center, the machining time of the lathe is shorter with respect to its arrangement time. For example, if it takes 1 minute to machine a work A, and, hence, 100 minutes to machine 100 pieces of the work A, it is impossible for the lathe to automatically operate for more than 2 hours. It is necessary to manually arrange for a work B when the machining of the work A is finished and before the work B starts to be machined, and therefore, even at night, it is necessary to manually arrange the works at, for example, two hour intervals. Accordingly it has been considered that automatization of an NC lathe for a period of many hours is difficult to realize despite great hopes in this respect.

SUMMARY OF THE INVENTION

Accordingly it is an object of the invention to eliminate the problems in the prior art and to fulfill the demand for extended automatic operation for a lathe.

To this end, this invention provides an NC lathe with a robot for automatically exchanging a work and chuck claws in which the work and chuck claws are exchanged by the robot between a chuck and a feeder, namely a storing device.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
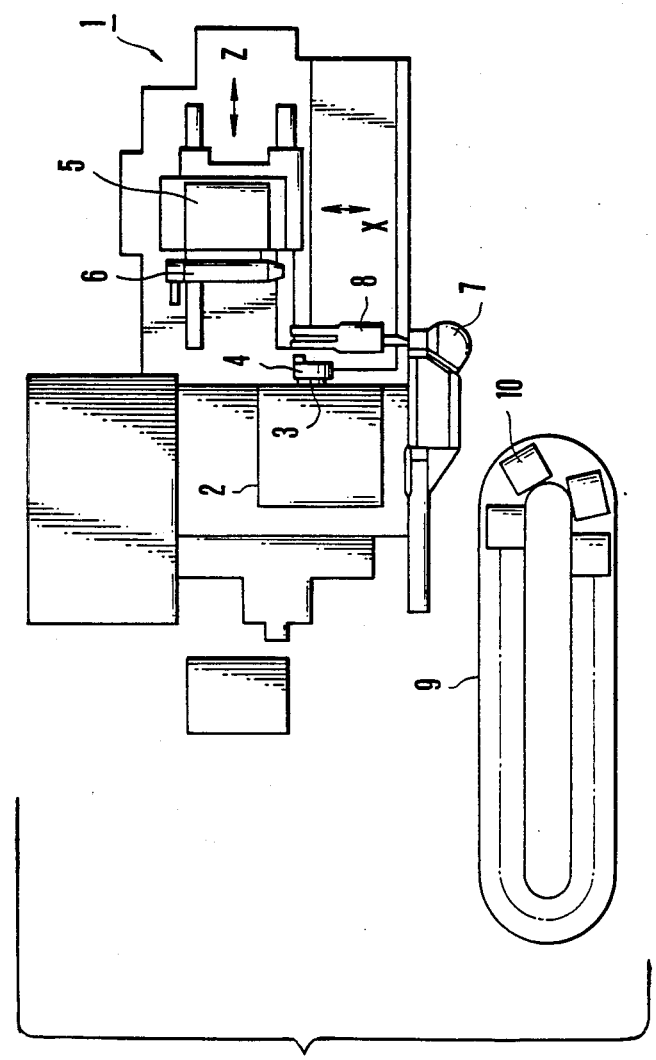
FIG. 1 is a plan view of an NC lathe with a robot for automatically exchanging works and chuck claws according to the invention.

Referring first to FIG. 1, referential numeral 1 represents a numerically controlled lathe (hereinunder referred to as "NC lathe"), with a spindle head 2 provided thereon. On the spindle head 2, a spindle 3, namely a shaft, is rotatably provided, and a chuck 4 having chuck claws which will be described later is rotatably provided on the spindle 3. Referential numeral 5 is a tool rest which is provided on the NC lathe 1 such as to be slidable in the direction parallel or orthogonal to the axis of the spindle 3 and a turret head 6 on which a tool is mounted is provided on the tool rest 5 such as to be capable of swivelling index. A robot 7 having an arm 8 which will be described later is disposed in the vicinity of the chuck 4. A feeder 9 is arranged in the vicinity of the robot 7 as a storing device which is capable of swivelling index, and on the feeder 9 are provided a plurality of pallets 10 for carrying a magazine containing a work and chuck claws which will be described later.

Figure 2:
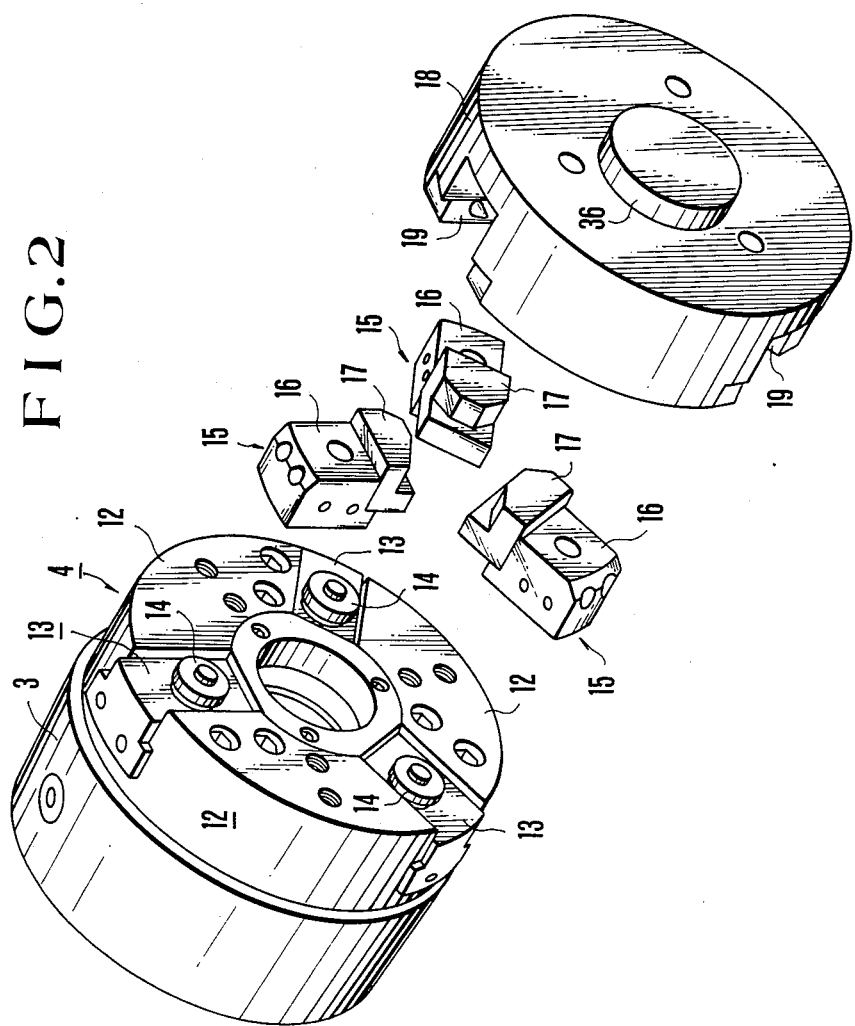
FIG. 2 is a perspective view of a chuck and a magazine according to the invention.

The chuck 4 will next be explained with reference to FIG. 2. The body 12 of the chuck 4 is bolted to the spindle 3 by bolts (not shown) or the like. Three master jaws 13 of the same configuration are provided on the body 12 at the same angle, and these master jaws are respectively slidable in the radial direction of the spindle 3 by the known method. A clamp pin 14 having a T-shaped cross section is protrudingly provided on the side surface of each of the master jaws 13 which is parallel to the end surface of the body 12, and a chuck claw 15 is mounted on the body 12 through these respective clamp pins 14. The chuck claw 15 consists of a base jaw 16 which engages with the clamp pin 14 and a claw portion 17 which is secured to the base jaw 16 by a bolt or the like. Three claw portions 17 are designed to grasp a work. Incidentally, a chuck claw exchange type chuck is not limited to the chuck of this embodiment and a chuck having the structure which is disclosed in Japanese Patent Application Nos. 52769/1981, 107487/1981 or 88984/1981 by the application of the present applicant may be used. Referential numeral 18 denotes a magazine which removably houses the chuck claws 15 at the end portions and which has a cylindrical configuration and approximately the same diameter as the body 12. At the fore end portion of the magazine 18, three housing grooves 19 are formed equiangularly and at the rear end portion thereof a cylindrical knob 36 is protrudingly provided. This knob 36 is coaxial with the magazine 18 and the radius of the knob 36 is formed to be approximately the same as that of a work which will be described later.

Figure 3:
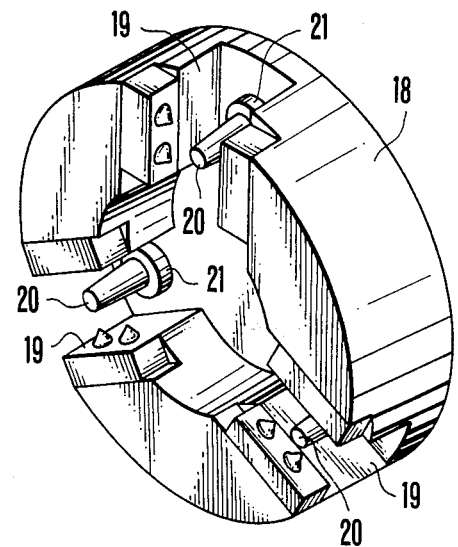
FIG. 3 is a perspective view of the other side of the magazine.
Figure 4:
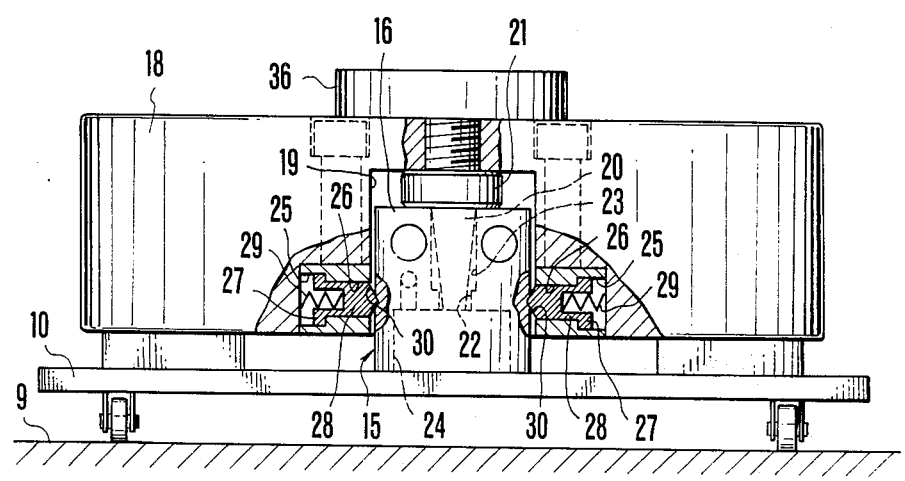
FIG. 4 is a partial sectional view of the magazine on a pallet.
Figure 5A:
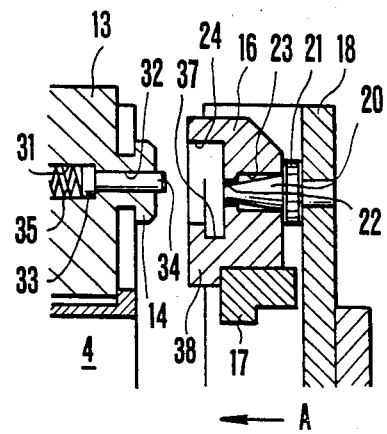
FIGS. 5a–5d are explanatory views of the operation of exchange of chuck claws.
Figure 5B:
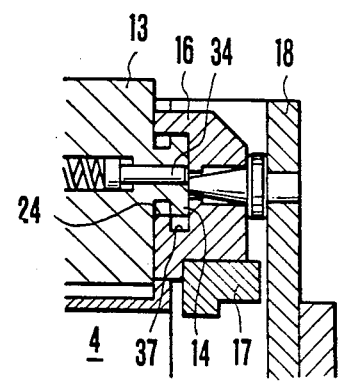
Figure 5C:
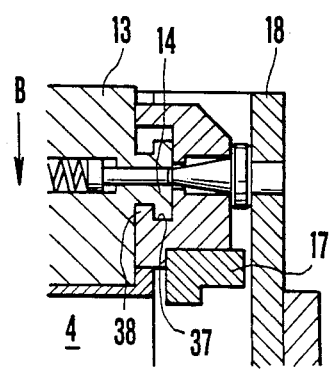
Figure 5D:
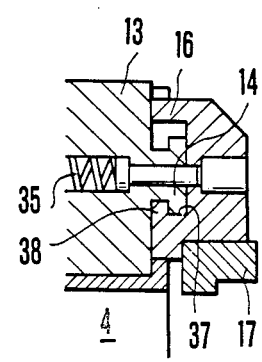

In the perspective view of the magazine 18 in FIG. 3, the width of the housing groove 19 is substantially the same as the width of the chuck claw 15, and on the bottom of each groove 19 a frustoconical positioning pin 20 is protrudingly provided. These pins 20 are parallel to the axis of the magazine 18 and a collar 21 is provided on the base of each pin 20. FIG. 4 illustrates the pallet 10 on the feeder 9 on which the magazine 18 is placed with a chuck claw 15 housed therein. Though in the Figure only one chuck claw 15 is shown, the other two chuck claws are similarly housed in the housing grooves 19 at the same time. One end surface of the base jaw 16 is in contact with the collar 21 of the pin 20, and the pin 20 is inserted into a through hole 23 which is formed on the base jaw 16 and which has a small diameter portion 22. On the other end surface of the base jaw 16 a bore 24 is formed such as to receive the clamp pin 14 of the master jaw 13, and this bore 24 is communicated to the through hole 23 through the small diameter portion 22. On the facing side walls of the housing grooves 19 bores 26 having stepped portions 25 are respectively formed, and these bores 26 open to the respective side walls in the form of small diameters which are substantially orthogonal to the respective side walls. A locking pin 28 which is tapered at the fore end portion and has a large diameter portion at the other end is slidably inserted into the bore 26 and a spring 29 is inserted between the bottom of the bore 26 and the locking pin 28. Though the locking pin 28 is urged toward the base jaw 16 by virtue of the repulsion force of the spring 29, since the large diameter portion 27 engages with the stepped portion 25, it can only slide a restricted amount. The fore end portions of the locking pins 28 which project from the opening portions of the bores 26 are respectively fit into locking grooves 30 which are formed on both side surfaces of the base jaw 16 such as to ensure the state of housing the chuck claw 15 in the chucking groove 19.

Referring to FIG. 5, a tunnel 32 the end of which opens to the end surface of the clamp pin 14 and which has a stepped portion 31 at the other end portion thereof is formed on the master jaw 13, a positioning pin 34 on the spindle side having a large diameter portion being slidably inserted into the tunnel 32. A spring 35 is inserted between the bottom of the tunnel 32 and the large diameter portion 33. Though the positioning pin 34 is urged toward the outside of the end surface of the clamp pin 14 by virtue of the repulsion force of the spring 35, since the large diameter portion 33 engages with the stepped portion 31, the amount which it can slide is restricted. The pin 34 is parallel to the axis of the spindle 3 and the end portion of the pin 34 projects from the end surface of the clamp pin 14 by a predetermined length. The radius of the tunnel 32 is approximately the same as that of the small diameter portion 22 of the through hole 23 on the base jaw 16. On the magazine 18 side, on the other hand, an engaging bore 37 which is coaxial with the through bore 23 and has approximately the same radius as the clamp pin 14 is formed on the bore 24. The centers of the bore 24 and the engaging bore 37 are offset in the radial direction such as to form a stepped portion 38 for engagement between the bore 24 and the engaging bore 37.

Figure 6:
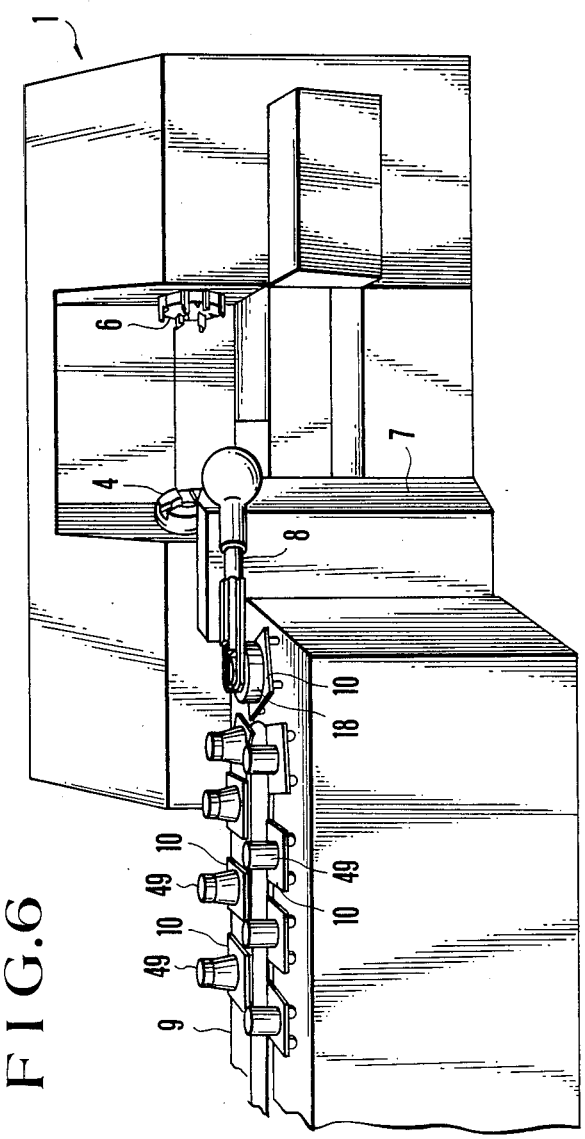
FIG. 6 is an enlarged elevational view of the NC lathe shown in FIG. 1.

FIG. 6 is an expanded view of the robot 7 and the feeder 9. By the instruction of a control device which will be described later, the robot 7 receives a workpiece 49 and the magazine 18 on the feeder 9 and supplies them onto the chuck 4. The radius of the knob 36 of the work 49 which is grasped by the arm 8 of the robot 7 is the same as that of the knob 36 of the magazine 18. A specific number is assigned to each of the pallets 10 and the number of a chuck claw is assigned to the magazine 18 as a specific number. Further, a number denoting the type of work is assigned to the work 49 on the pallet 10. The feeder 9 is driven by a motor not shown so as to feed a series of pallets 10 into the operational range of the robot 7. In this way a feeder which carries a plurality of pallets 10 with a plurality of works 49 and magazines 18 thereon serves as a storing device for the works 49 and the chuck claws 15.

Figure 7:
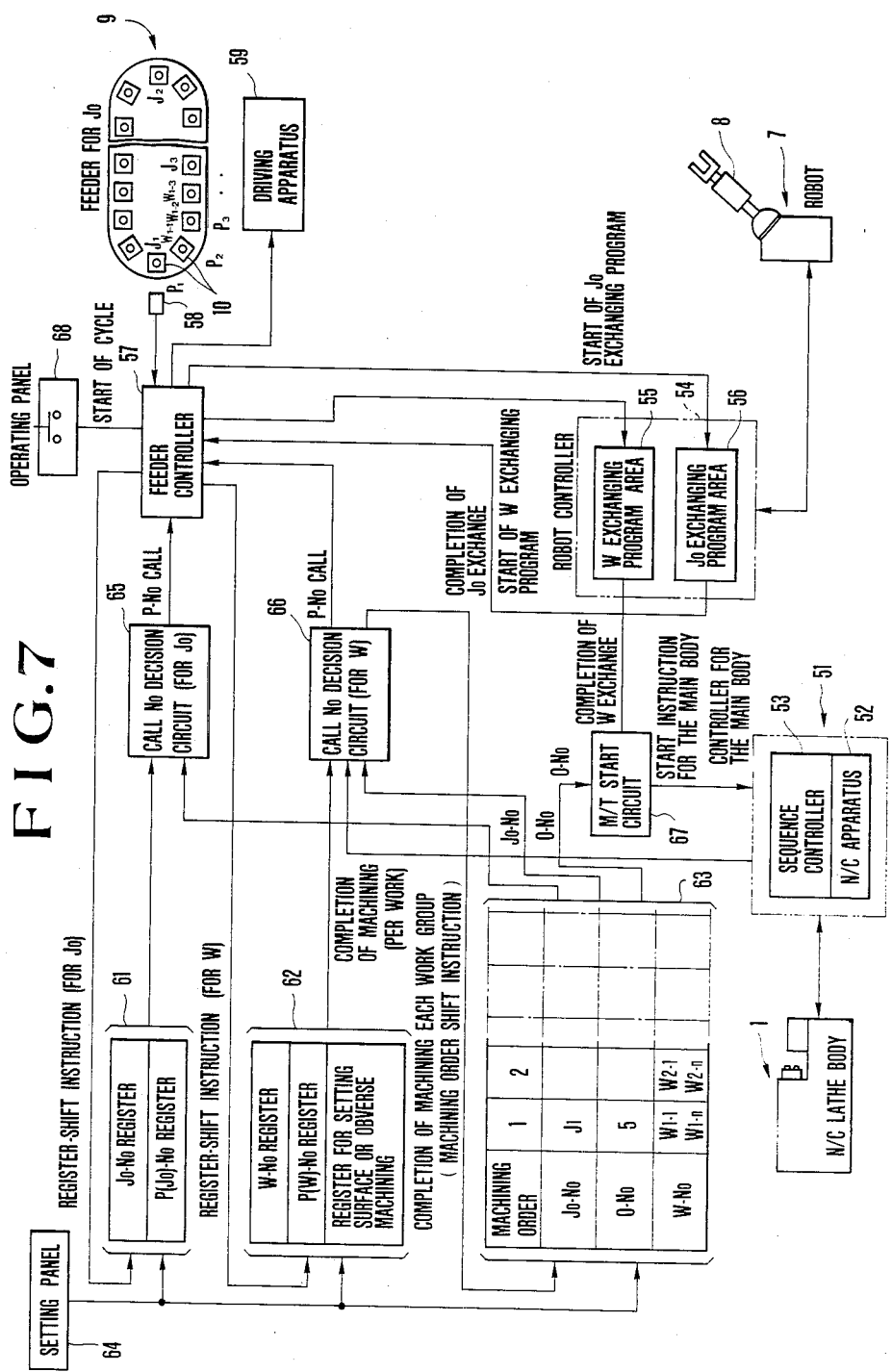
FIG. 7 is a schematic view of the structure of an embodiment of a control device according to the invention.

FIG. 7 shows the structure of an example of a control device for an NC lathe with a robot for automatically exchanging a work and chuck claws.

At a predetermined position of the NC lathe 1 a control device 51 is provided, and on the control device 51 an NC device 52 for controlling the NC lathe 1 is provided. This NC device 52 has a function of indexing a tool on the tool rest 5 and a sequence controller 53 for controlling the sequence of the NC lathe 1 is integrally incorporated into the NC device 52. Referential numeral 54 represents a robot controller for controlling a robot, in which a work exchanging program area 55 and a jaw, namely a chuck claw, exchanging program area 56 are provided. Though the contents of the program for exchanging works and that for exchanging chuck claws resemble each other, they are in fact different. A feeder controller 57 controls a storing device, namely the feeder 9, to which a position detector 58 of the feeder 9 is connected. A driving device 59 for rotating or suspending the feeder 9 is connected to the feeder controller 57. A first register 61 is connected to the feeder controller 57, and a specific pallet number and the number of specific jaws, namely chuck claws, which have been attached to the pallet in advance are stored in the first register 61.

A second register 62 is connected to the feeder controller 57, and a specific pallet number and the number of a specific work which has been attached to the pallet in advance are stored in the second register 62.

Referential numeral 63 is a third register which is connected to the feeder controller 57, and in this register 63 is stored a preset machining schedule. The machining schedule is laid out for the purpose of indicating the machining order which is determined by the operator, and in this schedule the numbers of the jaws, i.e. chuck claws, and the program numbers, i.e. O-number, in correspondence with the work numbers of various kinds of machining programs are indicated in sets. For example, the Figure shows that in the first machining (1), the number of the chuck claws is $J_1$, the work numbers are from $W_{1-1}$ to $W_{1-n}$ and machining of $\overline{O}$ number (5) is executed. These first, second and third registers 61, 62 and 63 are connected to a setting panel 64, and by setting the various data described above on the switches (not shown in the Figure), the data are input and set in these registers.

The first and second registers 61 and 63 are connected to a first decision circuit 65, the output side of which is connected to the feeder controller 57. In accordance with the order of the machining schedule, the number $J_1$ of the chuck claws of the machining order (1), for example, is input to the first decision circuit 65 from the third register 63 and the number $P_k$ of the pallet to which the chuck claws $J_1$ are attached is input thereto from the first register 61, whereby the index position is determined.

The second and third registers 62 and 63 are connected to a second decision circuit 66, the output side of which is connected to the feeder controller 57.

In accordance with the order of the machining schedule, the work numbers $W_{1-1}$ to $W_{1-n}$ of the machining order (1), for example, are input to the second decision circuit 66 from the third register 63 and the number $P_j$ of the pallet to which the works $W_{1-1}$ to $W_{1-n}$ are attached is input thereto from the second register 62, whereby the index position is determined.

The third register 63 is connected to the sequence controller 53 through a machine tool (M/T) start circuit 67, and the number of the machining program $\overline{O}$ in accordance with the machining schedule are input to the M/T start circuit 67. The M/T start circuit 67 receives this signal and gives the sequence controller 53 the start instruction of the NC lathe 1 and a signal for specifying the $\overline{O}$-number.

Further, the output side of the work exchanging program area 55 of the robot controller 53 is connected to the M/T start circuit 67, to which a work exchange completion signal is input.

One of the output sides of the feeder controller 57 is connected to the input side of the work exchanging program area 56, and the other is connected to the input side of the chuck claw exchanging program area 56. The output side of the chuck claw exchanging program area 56 is connected to one of the input sides of the feeder controller 57. From the feeder controller 57 a work exchanging program start signal and a chuck claw exchanging program start signal are fed to the robot controller 54, and from the chuck claw exchanging program area 56 of the robot controller 54 a chuck claw exchange completion signal is fed to the feeder controller 57.

The feeder controller 57 is connected to the first and second registers 61 and 62, a register shift instruction signal for chuck claws is supplied to the first register 61 and a register shift instruction signal for a work to the second register 62.

One of the output sides of the second decision circuit 66 is connected to the third register 63, a machining order shift instruction signal being output every time a work group (e.g. $W_{1-1}$ to $W_{1-n}$) is completed.

An operating panel 68 having a switch for cycle starting is connected to the feeder controller 57.

To each of the pallets 10 on the feeder 9 numbers $P_1$, $P_2, \ldots P_n$ are respectively given, and on the pallet $P_1$ is placed the magazine containing the chuck claws $J_1$, on the pallet $P_2$ the work $W_{1-1}$, on the pallet $P_3$ the work $W_{1-2}$ and on the pallet $P_4$ the work $W_{1-3}$ (in the case of n=3), respectively.

The sequence controller 53 is connected to the second decision circuit 66, to which a work completion signal is output every time a work, for example, $W_{1-1}$ is completed.

Figure 8:
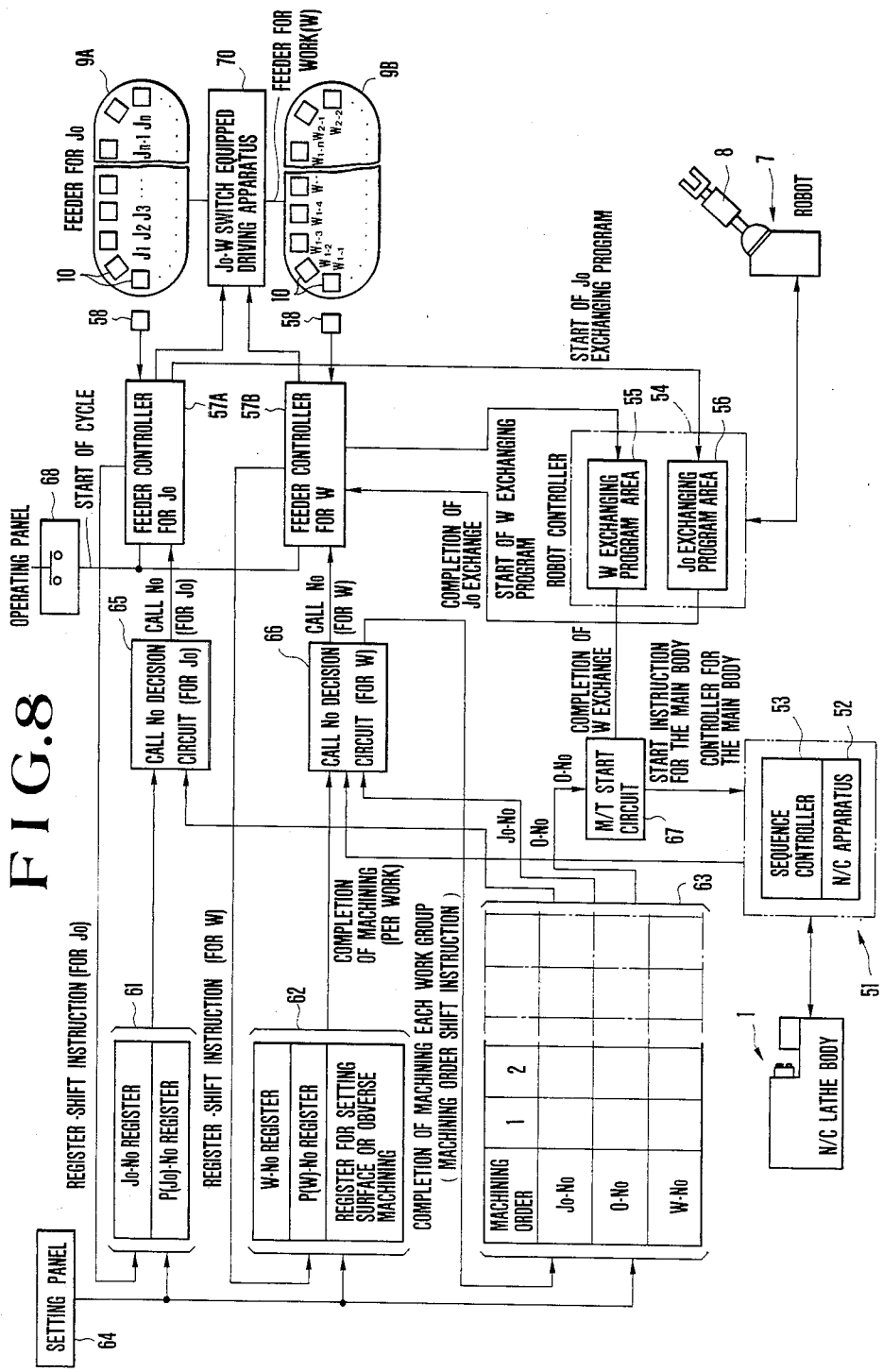
FIG. 8 is a schematic view of the structure of another embodiment of a control device according to the invention.

Referring to FIG. 8, which shows another embodiment of this invention, a feeder for works is provided separately from the feeder for chuck claws.

In other words, the feeder consists of the feeder 9A for magazines supplying chuck claws and the feeder 9B exclusively for storing works. In correspondence with these feeders, a feeder controller for chuck claws 57A, a feeder controller for works 57B and two position detectors are respectively provided, and a driving device 70 for selectively driving the feeders 9A and 9B is also provided.

Figure 9:
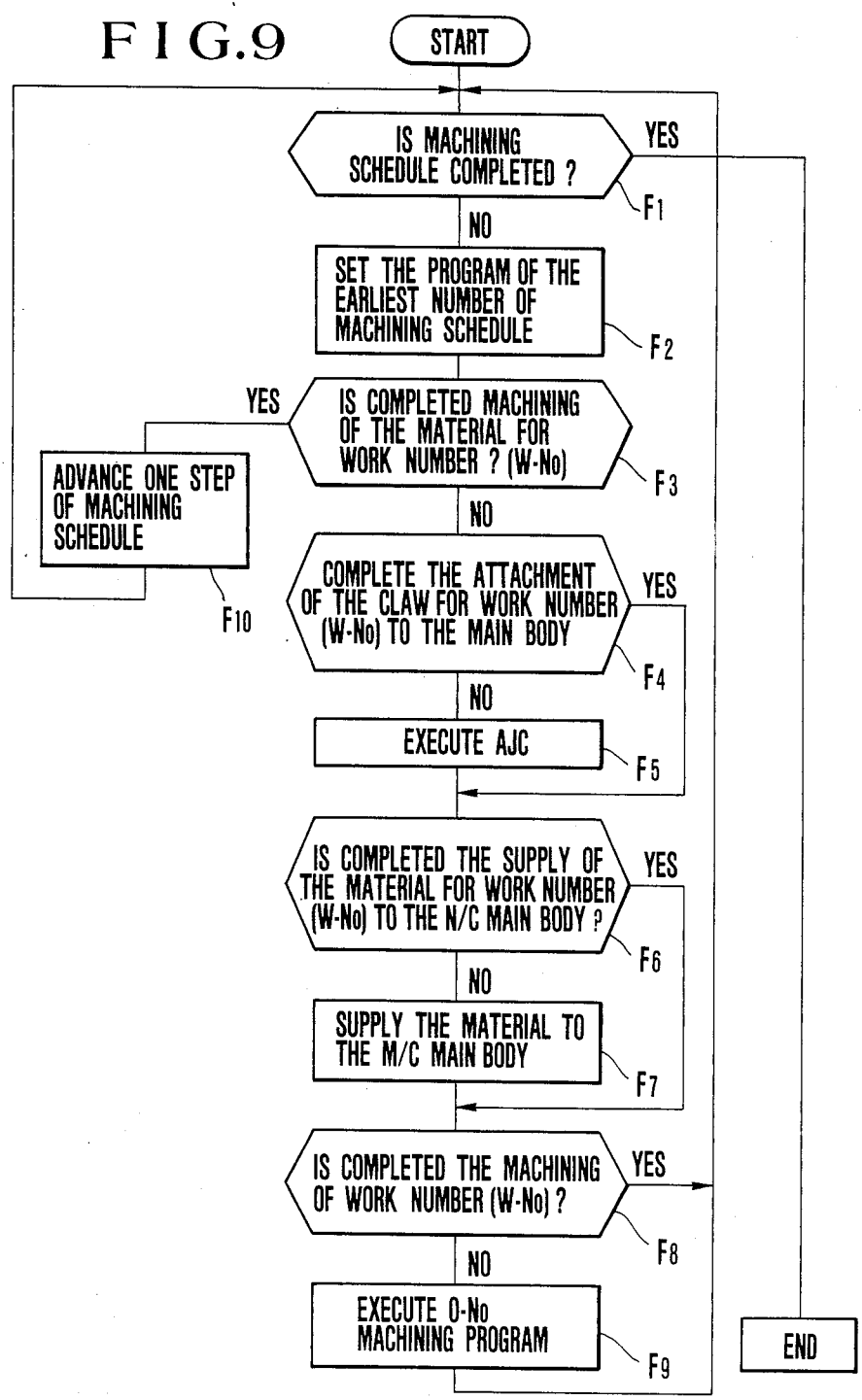
FIG. 9 is a flow chart explaining the operation of a feeder.

Prior to explanation of this invention with reference to the flow chart shown in FIG. 9, the mounting operation of the chuck claws 15 on the chuck 4 will be explained with reference to FIG. 5.

Referring first to FIG. 5 (a), the master jaw 13 of the chuck 4 is fully opened in the radial direction. In this state, the magazine 18 is made to coaxially approach and be brought into contact with the chuck 4 by the arm 8 of the robot 7 (in the direction indicated by the arrow A). Then, as is shown in FIG. 5(b), the clamp pin 14 of the master jaw 13 is inserted into the bore 24, and the positioning pin 34 is pressed against the bottom of the engaging bore 37. The positioning pin 34 is pressed by this bottom surface and slides back toward the spring 35. When the master jaw 13 is fully closed in this state, that is, when the master jaw 13 is moved in the axial direction (in the direction indicated by the arrow B) in FIG. 5(c), the clamp pin 14 engages with the engaging bore 37 and the clamp pin 14 is in the position where the positioning pin 14 and the pin 20 of the magazine 18 is concentric. When the magazine 18 is removed from the chuck 4 by the arm 8 of the robot 7, the positioning pin 34 is fitted into the small diameter portion 22 of the base jaw 16 by virtue of the repulsion force of the spring 35 (FIG. 5(d)). The above operations are conducted simultaneously with respect to three chuck claws 15. In order to grasp the work 49, the master jaws 13 are fully opened together with the chuck claws 15.

The total operation will next be explained with reference to the block diagram in FIG. 7.

For the automatic operation of the NC lathe 1, a set consisting of the magazine 18 containing the jaws, i.e. claws 15, necessary for machining and the work 49 are prepared in the machining order on the pallets 10 on the feeder 9 according to the operation instructions by the operator. With respect to this set, the setting panel 64 registers into the first register 61 the number of the magazine 18, namely the jaw number, on the feeder 9 and the number of the pallet 10 on which the magazine 18 is placed, and registers into the second register 62 the number of the work 49 and the number of the pallet 10 on which the work is placed. The setting panel 64 next registers into the third register 63 the number of the magazine 18 which corresponds to the number of the work 49 which is arranged in the machining order and the machining program number, i.e. $\overline{O}$-number.

When the registry for each register and preparation for the feeder 9 is completed in this way, the cycle start switch 68 on the operating panel is pushed. The start instruction operation is then confirmed by the feeder controller 57 and the machining order 1 of the machining schedule is instructed by the third register 63. The number $J_1$ of the necessary chuck claws is supplied from the third register 63 to the first decision circuit 65, the number ($J_1$) of the magazine 18 and the number of the pallet 10 corresponding to the magazine 18 is supplied from the first register 61 to the first decision circuit 65. The number ($P_1$) of the pallet 10 which carries the magazine 18 No. $J_1$ is then fed to the feeder controller 57. The feeder controller 57 rotates the feeder 9 by means of the driving device 59, and suspends the feeder 9 when detecting the pallet 10 No. ($P_1$) by means of the position detector 58. Immediately after this, a chuck claw exchanging program start signal is supplied from the feeder controller 57 to the robot controller 54, and the content of the chuck claw exchanging program area 56 is fed to the robot 7. The arm 8 of the robot 7 then grasps the magazine 18 No. $J_1$ so as to mount the chuck claws 15 on the chuck 4 in the above-described operation, and restores the empty magazine 18 No. $J_1$ to the original position.

The signal of the completion of exchanging the chuck claws 15 on the magazine 18 No. $J_1$ is supplied to the feeder controller 57, which receives this and assumes the state of waiting for the operation of work exchange, which will be described later.

The number of the work $W_1$ to be operated is next fed from the third register 63 to the second decision circuit 66, and the number $W_{1-1}$ of the work 49 and the number ($P_2$) of the pallet 12 which carries the work 49 is fed from the second register 62 to the second decision circuit 66, from which this signal is supplied to the feeder controller 57. The feeder controller 57 rotates the feeder 9 by means of the driving device 59, and suspends the feeder 9 when the position detector 58 detects the pallet 10 No. ($P_2$). At the same time, with the suspension of the feeder 9, a work exchange program start signal is supplied from the feeder controller 57 to the robot controller 54 and the content of the work exchange program area 55 is supplied to the robot 7. Since the knob of the work 49 and the knob 36 of the magazine 18 have the same diameter, the arm 8 of the robot 7 grasps the work 49 No. $W_{1-1}$ on the pallet 10 No. ($P_2$) so as to insert it between the chuck claws 15 of the machining order (1) which is mounted on the chuck 4. The chuck 4 is then closed so as to grasp the work 49 No. $W_{1-1}$ by the chuck claws 15. When the loading of the work 49 is completed, the robot controller 54 supplies a work 49 exchange completion signal to the M/T start circuit 67, which instructs a main body start instruction and a signal of a machining program number ($\overline{O}$-NO) to the NC device 52. The NC lathe which has received a machining instruction from the NC device 52 starts machining with a predetermined tool while holding the work 49 No. $W_{1-1}$ by means of the chuck claws 15 which were on the magazine 18 No. $J_1$.

When the machining of the work 49 No. $W_{1-1}$ is finished, the NC device 52 feeds the completion signal for this work to the second decision circuit 66, and a signal for calling the pallet 10 No. $P_3$ is transferred to the feeder controller 57 in order to exchange the work 49 No. $W_{1-1}$ on the chuck 4 for the work 49 No. $W_{1-2}$ on the pallet 10 No. $P_3$. In this way the pallet 10 No. $P_3$ which carries the work $W_{1-2}$ on the feeder 9 is called, and the work $W_{1-1}$ on the chuck 4 is exchanged for the work $W_{1-2}$. When machining of work $W_{1-n}$ is finished, the second decision circuit 66 receives a machining completion signal for that work from the NC device 52 and supplies it to the third register 63, whereby the machining order is shifted.

The machining schedule 2 is next designated, a set consisting of the magazine 18 No. $J_2$ and the work 49 No. $W_{2-1}$ are automatically arranged on the NC lathe 1 in the same way as in the machining schedule 1, and the machining of the next $\overline{O}$-number is continued until the work 49 No. $W_{2-n}$. Thereafter the next machining schedule 3 is designated. This is to be repeated and the NC lathe according to the invention carries out machining day and night in an unmanned factory.

Control of the feeder 9 will now be explained with reference to FIG. 9.

When the preparation described above is completed, the cycle start button of the operation panel 68 is pushed for start-up. In $F_1$ judgement is made as to whether the machining schedule in the third register 63 is completed or not, and if it is incomplete, the program of the earliest number of the machining schedule is set in $F_2$. For example, if the machining of the machining order 2 is completed, the third program is set in $F_2$. $F_3$ judges whether the material for the work number (W - No), i.e. work machining is completed or not. If all the works $W_{1-1}$ to $W_{1-n}$ have not yet been completed, for example, the works $W_{1-1}$ to $W_{1-3}$ only have been completed, $F_4$ first judges whether the chuck claws for the designated work number (W-No) have been attached to the NC lathe. If the judgement is negative, a chuck claw exchanging operation $F_5$ is executed. If the predetermined chuck claws have been attached to the NC lathe, $F_6$ judges whether the work corresponding to the designated work number (W - No) has been supplied to the NC lathe. If the judgement is negative, supply or exchange of the work is executed in $F_7$. If the correct work has been supplied, judgement is made as to whether the machining of the designated work number (W - No) has been completed or not ($F_8$). If it has not been completed, machining of the remaining $\overline{O}$-number is executed in FIG. 9. If completed, the machining schedule in the register is confirmed.

Returning to $F_3$, if machining of all the works $W_{1-1}$ to $W_{1-n}$ has been completed, $F_{10}$ shifts the number of the machining schedule in the register up by one.

As has been described above, according to the invention, works and jaws are arranged on the feeder in sets, and one and the same robot can exchange and attach these works and jaws to the NC machine tool. Accordingly, this invention can provide an NC machine tool suitable for machining a small quantity of many kinds of works. Furthermore, this invention is advantageous in that by storing works and jaws for which a machining schedule has been laid up on the specific pallets arranged on the feeders, and by building up a system for calling a machining schedule number, jaw number and a work number together with the respective pallets by means of the control device, and for machining the work with a predetermined tool, a turning center can be established in which the machining time is prolonged and automatization is promoted.

In addition, the invention provides a versatile NC lathe capable of shortening to a great extent the time which has conventionally been spent for arrangements to a great extent and coping with variations in machining demands.

While there have been described what are at present considered to be the preferred embodiments of the invention, it will be understood that various modifications may be made therein, and it is intended that the appended claims cover all such modifications as fall within the true spirit and scope of the invention.

What is claimed is:

1. A numerical control lathe assembly for performing operations on workpieces comprising:
   a rotatable chuck;
   a plurality of means for holding a workpiece, each said workpiece having a holding knob having a first diameter; and
   a plurality of magazines which carry a plurality of jaws for said chuck, each said magazine having a knob with the same diameter as said first diameter of said holding knobs;
   means for storing said plurality of workpiece holding means and said plurality of magazines on one surface thereof and having a predetermined robot access area defined thereon and for selectively indexing a particular one of said plurality of workpieces or magazines to said robot access area in response to an applied signal commanding said particular one of said workpieces or magazines;
   robot means, having a single robot arm that is located to have at least two positions, one adjacent said rotatable chuck and an other which picks up items from said robot access area on said storing means, and movable between said two positions responsive to an applied command, for exchanging one of said workpieces or chuck jaws between said robot access area of said storing device and said rotatable chuck, responsive to an applied command; and control means, connected to control said robot means and said storing means, for storing a prestored sequence of workpieces and chuck jaws and sequentially executing said sequence by:
(1) commanding said storing means to move a magazine to said robot access area,
(2) commanding said robot arm to move said magazine to said rotatable chuck,
(3) commanding said storing means to move one of said workpiece holding means to said robot access area, and
(4) commanding said robot arm to move said workpiece to said rotatable chuck.

2. A lathe for performing operations on a workpiece, comprising:

a rotatable chuck;

storing means for storing a plurality of rotary members, including a plurality of chuck jaw holding members and workpiece holding members, on a single surface thereof, said storing means including means for indexing between different positions, each one of which locates a different one of said rotary members at a predetermined location on said storing means;

a single robot arm for automatically transferring a rotary member from said predetermined location of said storing means to said rotatable chuck; and controlling means for, according to a prestored sequence:
(a) controlling said indexing of said storing means to locate one of a chuck jaw holding means at said predetermined location; and
(b) operating said robot arm to transfer said chuck jaw or workpiece to said rotatable chuck.

3. A device as in claim 2 wherein said controlling means is also for:
(c) controlling said indexing of said storing means so that a location of said predetermined rotary member is at said predetermined location; and
(d) stopping the indexing of said storing means at said predetermined location.

4. A device as in claim 3 wherein said controlling means includes:
(e) means for storing a map representing which rotary member is at each location in said storing means, and
(f) means for indexing said storing means to a proper location when any rotary member is specified.

5. A device as in claim 3 wherein said controlling means includes:
(e) means for storing a predetermined sequence of operations on particular rotary members which are desired to be performed; and
(f) means for controlling said indexing and said operation of said robot means so that proper claws and workpieces are automatically exchanged between at proper times.

6. A lathe for performing operations on a workpiece, comprising:

a rotatable chuck means;

storing means for storing a plurality of workpieces and jaws, and for indexing between different positions, each position locating one of said workpieces or said jaws at a transfer location;

means for indexing said storing means between said different positions;

robot means for transferring an object located at said transfer location of said storing means between said transfer location and said chuck means; and controlling means for:
(a) automatically specifying a next workpiece to be operated upon according to a predetermined sequence;
(b) automatically specifying a next chuck jaw to be used according to a predetermined sequence;
(c) controlling said indexing means so that a next object to be operated on is indexed to said transfer location;
(d) controlling said robot means to exchange an object to be operated upon between said chuck means and said transfer locations;
(e) determining when said transfer operations are complete; and
(f) finally, initiating an operation of said lathe.

7. A method for performing operations on a workpiece comprising:

storing a J-number representing a location of a plurality of chuck jaws on a storing device;

storing an N-number representing a location of plurality of specific workpieces on the same storing device that stores the chuck jaws;

storing a preset machining schedule including J-numbers of chuck jaws as a function of N-numbers of workpieces;

determining if a proper chuck jaw is in place and if said proper chuck jaw is not in place, performing a routine comprising the steps of:
(a) determining the position of the storing device;
(b) indexing the storing device to a proper location based on the J-number of the chuck jaw desired to be transferred;
(c) transferring the chuck jaw between the transferring location and the chuck using a robot arm; and
(d) again determining if said proper chuck jaw is in place, and repeating steps (a)–(c) if not;

determining if a proper workpiece is located on the chuck, and if said proper workpiece is not located on the chuck, performing a routine comprising the steps of:
(e) again determining the position of the same storing device as in said step (a);
(f) indexing the storing device to a proper location based on the N-number of the workpiece desired to be transferred;
(g) transferring the workpiece between the storing device and the chuck using the same robot arm as in said step (c); and
(h) against determining if said proper workpiece is in place and repeating steps (e)–(h) if not.

* * * * *